Figure 1:
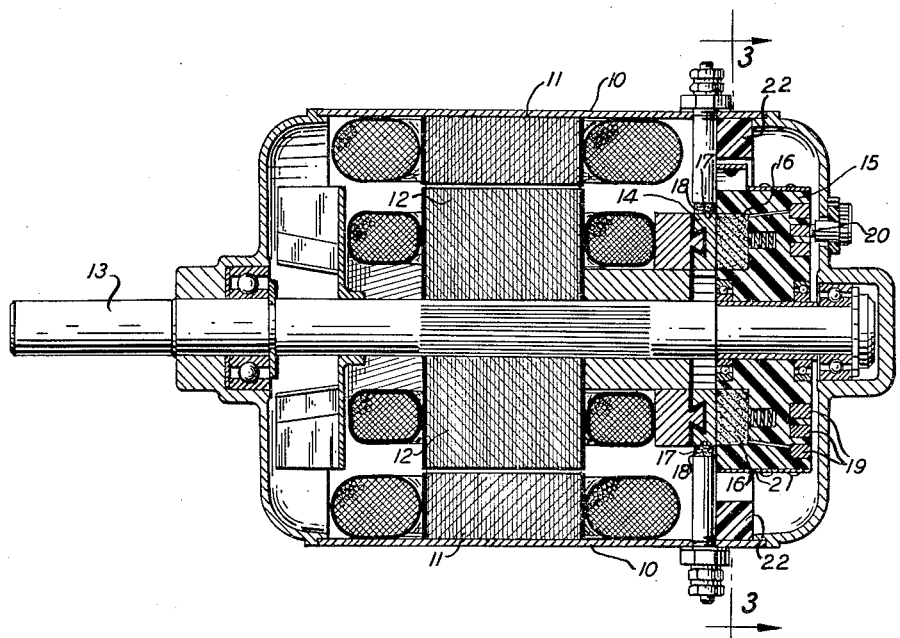

T. G. KIRBY
T. H. OSTER
INVENTORS

Feb. 19, 1957 T. G. KIRBY ET AL 2,782,329
DYNAMOTOR
Filed June 8, 1953 2 Sheets-Sheet 2

T. G. KIRBY
T. H. OSTER
E. C. McRae
INVENTORS
BY J. R. Faulkner

ATTORNEYS under this United States Patent Office heading:

2,782,329

DYNAMOTOR

Thomas G. Kirby, Ecorse, and Thomas H. Oster, Dearborn, Mich., assignors to Ford Motor Company, Dearborn, Mich., a corporation of Delaware Application June 8, 1953, Serial No. 359,984

13 Claims. (Cl. 310—138)

This invention is directed to an alternator, and more particularly to an alternator capable of generating a constant frequency despite wide variations in rotor speed, or conversely to develop any desired frequency within its physical limitations at a constant rotor speed or even at a varying rotor speed. This invention is also concerned with the application of this type of alternator to the transportation industry where variable speed prime movers are inherently necessary. A further concern of this invention is the use of this alternator to generate constant and if desired commercial power frequencies from energy sources such as falling water and wind where it is usually advantageous to vary the speed of an alternator without the concomitant variation usually experienced in frequency.

Such a constant frequency, variable speed alternator may be constructed from an ordinary direct current shunt wound motor by removing the conventional brush carriage and brushes and substituting a brush carriage capable of continuous rotation. The entire magnetic circuit should be laminated. Energy is removed from such a brush carriage by means of slip rings which are connected to the brushes which bear upon the commutator. The energy is actually removed from the rotating system by other brushes which bear upon the slip rings. For example an ordinary two pole generator would be supplied with a rotatable brush carriage capable of urging the brushes against the conventional commutator and having the two brushes spaced 180 mechanical degrees and 180 electrical degrees from each other. This brush carriage is also supplied with a pair of slip rings one of which is electrically connected to each brush. Energy is obtained by causing fixed output brushes to bear upon the slip rings. At least one output brush must bear upon each slip ring, although the number of output brushes can be increased to any number necessary to remove the energy produced. The above description is of course that of a single phase machine.

It will be appreciated, however, that by judiciously altering only the brush carriage and output brushes this single phase machine may be converted into a polyphase machine having any desired number of phases. To make such a machine operate three phase the brush carriage is modified to provide three rotatable brushes spaced apart 120 electrical degrees and 120 mechanical degrees. Three slip rings are applied to the brush carriage and are electrically connected to the rotatable brushes which in turn bear upon the commutator. Energy is removed by output brushes bearing upon the three slip rings. It is apparent that at least three such output brushes must be provided, one bearing upon each slip ring. It is also apparent that any desired number of such slip rings may be employed as may be necessary to conduct the currents involved. Similar alterations to produce two phase current or any other number of phases will be immediately apparent to one skilled in the art and will not be further detailed here. To lower iron losses it is necessary that the entire magnetic path including the field or stator should be laminated. This is a departure from the usual direct current practice and results in a machine more closely resembling the ordinary repulsion induction alternating current motor.

In the case of lower speed machines having more than a single pair of poles, the brush carriage will have to be modified to correspond. For example, a four pole machine to produce three phase current is supplied with a brush carriage having six brushes spaced apart sixty mechanical degrees and one hundred twenty electrical degrees. The number of slip rings would remain three.

The brush carriage should be concentric with the main shaft of the generator, and should be supported on such shaft in such a manner that the two are freely rotatable with respect to each other. It is preferred to drive the brush carriage only by means of the frictional forces existing between the brushes bearing upon the commutator and the commutator itself, aided by the friction inherent in the bearings by which the brush carriage is supported on the generator main shaft. This driving friction must exceed the retarding friction of the output brushes upon the slip rings. It is however within the purview of this invention to rotatably support the brush carriage upon a fixed part of the generator as opposed to supporting it upon the rotating shaft. When the brush carriage is supported upon a fixed portion of the generator, either the brush friction must be made to exceed the bearing friction of the brush carriage upon the generator, plus the friction of the slip rings, or a separate driving means for the brush carriage must be provided.

A machine constructed with the brush carriage driven only by frictional forces (primarily friction between the commutator and brushes), if otherwise unaltered will produce a frequency which will closely approximate that dictated by the number of poles used and the instantaneous rotor speed. This is not desired since it defeats the purpose of providing a variable speed, fixed frequency alternator. This is caused by the fact that brush friction tends to lock the brush carriage in a fixed position with respect to the rotor. This type of operation is also detrimental since it causes overheating of the particular coils shorted by the brushes as they pass through the maximum fields of flux.

To provide a substantially constant frequency despite variations in rotor speed and to prevent undue heating of the particular coils being shorted by the brushes it is necessary to establish relative rotation between the brush carriage and the rotor. If the brush carriage is to be driven only by friction against the rotor it is obvious that such a differential speed can be obtained only by retarding the rotation of the brush carriage. This retardation may be accomplished by superimposing upon the brush friction force a separate force or forces whose variation with rotor speed is not identical with the frictional forces between the brushes and the commutator. The slip ring brushes used to obtain the output from the brush carriage will not in general serve for this purpose since this friction will vary in a general way with speed in the same manner as the friction between the brushes and the commutator and hence the slip ring friction can only be considered a quantity to be subtracted from the commutator brush friction. Like considerations apply to the friction between the brush carriage and the member supporting it.

It has been found that the necessary differential in speed between the brush carriage and the rotor may be obtained by adding a centrifugal governor to the brush carriage. This governor may take the form of a weight mounted to rotate at a speed proportional to the brush carriage, or it may be supported directly upon the brush carriage. This weight is spring biased towards its axis of rotation and is urged in the opposite direction by centrifugal force when the brush carriage is in operation. The movement of this weight away from its axis against the spring pressure and under the influence of centrifugal force causes either the weight per se, or a member influenced by the weight to frictionally contact a stationary brake member and retard the rotation of the brush carriage. Since the driving force (brush and bearing friction) produces a substantially constant torque over a wide range of speeds, and since once the movable braking member is moved into contact with the stationary member by centrifugal force the braking force generated is approximately proportional to the square of the speed, it is apparent that a sharp regulation of the brush carriage speed is possible through wide variations of the speed of the rotor.

A different governing action may be had by deliberately increasing the windage losses of the rotating brush carriage by adding thereto a fan member which may also assist in the cooling of the generator. This windage loss need not be engendered by a conventional fan structure, but may be secured by any addition to the rotating brush carriage structure which spoils its aerodynamic characteristics. The torque produced by windage is proportional to the square of the speed and when superimposed upon the brush friction torque will result in a substantially constant speed of rotation of the brush carriage.

A somewhat less sharp regulation of the speed of the rotating brush carriage may be obtained by adding to the brush carriage a metallic disc rotating in a strong magnetic field to produce eddy current losses. This is the standard method of retarding integrating watt hour meters and produces a load torque which is directly proportional to the speed. This load superimposed upon the constant brush friction torque will result in a substantially constant rotational speed of the brush carriage.

The three expedients described above have been enumerated as separate means of regulating the speed of rotation of the brush carriage. However, it will usually be found to be more advantageous to combine at least two of these expedients so that a conjoint action is obtained which is more satisfactory than either alone. For example the use of the centrifugal governor alone results in substantial wear on the braking mechanism when operated for long times and at high speeds. This wear may be eliminated for all practical purposes by the use of the windage brake or the eddy current brake in conjunction with the centrifugal friction brake. In such a case the eddy current or windage brake would be set to establish an equilibrium speed just comfortably above that for which the friction brake is set so that the bulk of the braking would be done by windage or eddy current losses and only a small residual load would fall upon the friction brake. The windage brake air currents would preferably be directed upon the friction brake surface for cooling purposes. With a knowledge of the characteristics of each of these braking means at hand, a skilled engineer can readily design a system employing one or more of these braking means to obtain the requisite governing at the least cost and commensurate with the service expected from the machine.

For vehicular use it is desirable to equip such an alternator with stationary, but adjustable brushes which will bear directly upon the commutator, but which will not interfere with the free rotation of the rotatable brush carriage described above. Such brushes will of course collect ordinary direct current. These brushes are required for at least three reasons. The first reason is to permit the output of the generator to be regulated as to voltage by the conventional direct current type of voltage regulator with which the transportation industry is familiar. The second reason is to provide a source of direct current suitable without further rectification for charging the vehicle storage battery.

The third and most important reason is to permit the generation of an alternating potential while the vehicle prime mover is at rest. This is necessary if the full advantages of the use of alternating current in the automotive field is to be realized. By way of example, the ignition system and the fuel pumping apparatus may best be operated directly from alternating current. Since both ignition current and fuel pressure must be established prior to starting, it is clear that an alternator directly connected to the prime mover in the usual manner cannot be used. To circumvent these difficulties, the alternator is driven by the prime mover through an over-running clutch which will permit the alternator to revolve as a motor while the prime mover is at rest. The stationary brushes which bear upon the commutator are connected across the battery potential when it is desired to operate the prime mover. While this may be done in any desired manner, it is probably simplest to have a single pair of contacts serve as an ignition switch and to connect the stationary brushes to the battery. The conventional one-way cutout employed in vehicular generator control would be omitted. The generator field is to be energized from this same circuit and through a conventional vehicular voltage control so that it is energized simultaneously with the stationary brushes which bear upon the commutator. The current control mechanism employed in vehicular generator controls should be omitted, or polarized, or thermally actuated so that it would not be operated by the starting inrush of current to the alternator.

When it is desired to have available alternating current when the prime mover is not in operation as for starting the prime mover, the full battery potential is applied to the alternator field and to the stationary brushes which bear upon the commutator. The machine will then be operated by the battery as a dirrect current motor and the rotor will revolve and carry with it the rotatable brush carriage. The rotation of the brush carriage will make alternating current immediately available from the slip rings. Rotation of the alternator rotor while the prime mover is at rest is possible by virtue of the over-running clutch interposed between the two units. To avoid localized overheating of the alternator if operated in this manner for prolonged periods, the speed obtained when operating from the battery as a motor should be slightly in excess of the governed speed of the brush carriage so that there is some relative motion between the brush carriage and the rotor.

Under circumstances where the additional expense and weight are not dominant considerations, the rotatable brush carriage may be driven by a separate motor. This separate brush driving motor may be either concentric with the generator, or entirely separate and connected thereto by mechanical means. If the driving motor be built concentric with the generator, a common field may be shared by the two machines. In the event the alternator is to be paralleled with an existing system, it is convenient to drive the brush carriage by a synchronous motor connected to such existing system, so that the energy available from the variable speed alternator is always in phase with the existing system. In such a machine connection to the existing system on starting may be made by closing the interconnection when the voltage of the variable speed alternator reaches approximately that of the system. In a three phase system, the same slip rings could be employed to energize the synchronous brush carriage drive motor and to deliver current from the variable speed alternator by incorporating a voltage or speed sensitive switch between the slip rings and the brushes of the rotatable brush carrier which bear upon the commutator. With the machine at rest, the initial energization of the field with direct current and the slip rings with alternating current from an existing system would bring the brush carriage up to synchronous speed and synchronize it with the existing system. When the speed or voltage of the variable speed alternator reached the proper value, the speed or voltage sensitive switch between the slip rings and the brushes carried by the rotatable brush carrier and bearing upon the commutator would close, and the delivery of energy would begin.

Conversely, such a variable speed alternator can serve as a variable speed alternating current motor even though energized from a source of fixed frequency. By separately driving the rotatable brush carriage at synchronous speed and in the proper phase relationship with the fixed frequency source of power, the speed of the commutator and rotor can be varied by simply varying the alternating current voltage applied to the slip rings. In any event, prolonged operation of the machine at precisely synchronous speed should be avoided to eliminate localized overheating of the rotor.

It will be appreciated that a variable speed alternator of this type with the brush carriage driven at synchronous speed by an existing system will be useful in converting wind or falling water to useful electrical energy at a fixed frequency and fixed voltage. By simply adjusting the field of the alternator to the value which will give the desired voltage, the prime mover may be permitted to move at that speed at which it can abstract the most energy from the wind or water. The machine will usually be adjusted to give maximum voltage at all speeds and the output matched to the load through a transformer. Fixed speed wind or water driven generators can only abstract the optimum amount of energy at a fixed wind velocity or water head. The use of this variable speed alternator permits adjustment to meet naturally varying conditions which are ordinarily beyond control.

Since it is inherent in a rotating brush machine that the brushes short circuit for a portion of the time fully energized armature coils, some difficulty from brush sparking would be anticipated. These difficulties have not materialized at low voltages, but may become a factor at higher voltages. Such difficulties may be minimized by the use of laminated brushes or by the use of preventative high resistance leads between the armature coils and the commutator bars.

The brush carriage of the constant speed, variable frequency alternator has been described as rotating in the same direction as the commutator. However, the invention contemplates the rotation of the commutator in a direction counter to that of the brush carriage. Operation with the commutator and brush carriage rotating in opposite directions has been found to be satisfactory. If complications due to centrifugal force upon the rotating brushes are to be minimized it is necessary that the commutator be of the face type as opposed to the conventional barrel type and that the plane of contact between the commutator and the brushes carried by the brush carriage be normal to the axis of the machine. The rotatable brushes are then spring biased in an axial rather than radial path and are insensitive to centrifugal force. It has been found to be advantageous to turn down and undercut the periphery of a face commutator and employ the commutating surface so produced to carry the stationary, direct current brushes. These brushes would be arranged with their axis on a radius of the machine and they would be spring urged in a radial direction.

Figure 2:
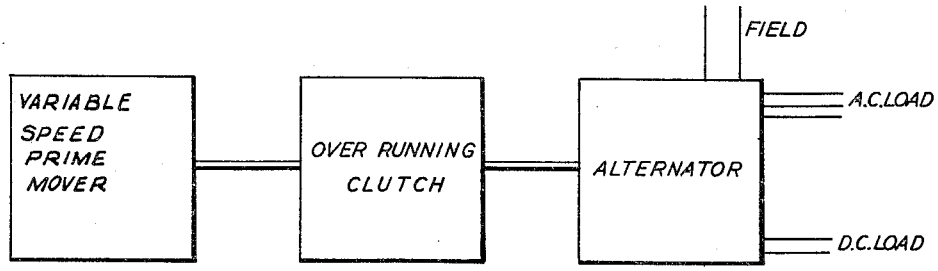
Figure 3:
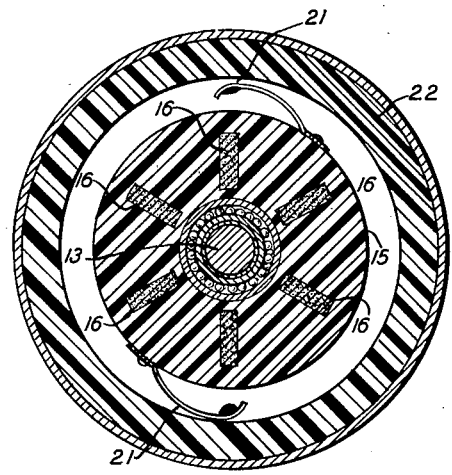
Figures 4, 5:
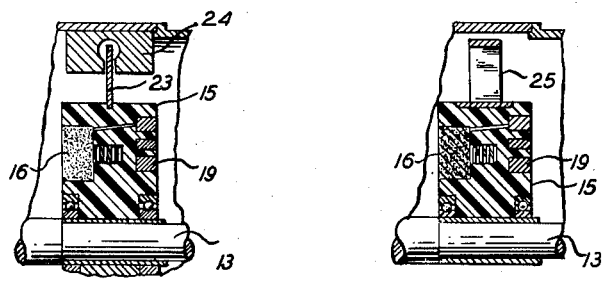

This invention may be further understood by reference to the drawings in which:

Figure 1 is a longitudinal cross section of an alternator constructed according to this invention and Figure 2 is a block diagram of the installation of an alternator in a motor vehicle, and Figure 3 is a radial cross section along the line 3—3 of Figure 1, and Figure 4 is a partial longitudinal section of a different braking means, and Figure 5 is also a partial longitudinal section of another different braking means.

Figure 6:
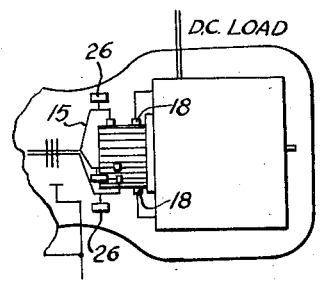

Figure 6 is a diagrammatic showing of still another braking means.

In Figure 1 the frame of the alternator is generally indicated as 10. Within this frame is mounted laminated field 11 and laminated armature 12 carried by shaft 13 which is journalled in the conventional manner. Face commutator 14 is mounted on one end of the shaft in a manner customary in direct current machinery. Adjacent the face of commutator 14 is brush carriage 15 in which are mounted the rotatable brushes. The instant machine is a four pole machine and hence brush carriage 15 carries 6 brushes 16. Upon the peripheral surface 17 of commutator 14 direct current brushes 18 bear. The energy is removed from brush carriage 15 through slip rings 19 mounted in the outer face of brush carriage 15. Slip rings 19 coact with load brushes 20 to remove the energy from the brush carriage. Only one of the three load brushes 20 is shown.

Brush carriage 15 is supplied with two weighted flat spring members 21 which are deflected centrifugally against stationary brake member 22 which tends to stabilize the speed of rotation of brush carriage 15. This action is clearly shown in Figure 3 which is a radial section along the line 3—3 of Figure 1. In this drawing the two spring members 21 are shown in the inactive position and out of contact with braking member 22. As the armature and brush carriage accelerate, centrifugal force will cause the spring members 21 to flex and rub against braking member 22.

With reference to Figure 2 it will be noted that the prime mover is directly mechanically connected to an over-running clutch which in turn is mechanically connected to the alternator. The over-running clutch is arranged so that torque can be transmitted to the alternator only in the direction in which the alternator tends to run. It will be noted that there are 7 leads coming from the three phase alternator. Two leads supply the excitation to the alternator field, three are the conventional three wire, three phase circuit, and the other two wires are connected to the direct current brushes and supply direct current.

Figure 4 is a sectional view of another type of braking mechanism. In this embodiment of the invention metallic disc 23 rotates between the poles of permanent magnet 24 and so functions as an eddy brake. It is to be understood that magnet 24 may be an adjustable electromagnet.

Figure 5 is a sectional view of still another type of braking mechanism. Here blade 25 serves to engender sufficient windage loss to impede the rotation of brush carriage 15.

Figure 6 is a diagrammatic showing of another braking system. Paddle means 26 are shown attached to brush carriage 15 to retard its rotation by air friction. Brushes 18 are provided to obtain a direct current from the armature.

We claim as our invention:

1. A dynamoelectric machine comprising a stationary field member, a wound rotor member provided with a commutator, said field and rotor members being laminated to conduct substantially all of the flux along an entirely laminated iron circuit, a rotatable brush carriage carrying rotating brushes which bear upon the commutator, slip rings mounted upon said brush carriage and connected electrically to the brushes carried in the rotatable brush carriage, and fixed alternating current output brushes bearing upon said slip rings, said brush carriage being propelled only by friction between itself and the rotor and commutator and being retarded by a speed sensitive braking means.

2. A dynamoelectric machine comprising a stationary field member, a wound rotor member provided with a commutator, a rotatable brush carriage carrying rotating brushes which bear upon the commutator, said field and rotor being laminated to conduct substantially all of the flux along an entirely laminated iron circuit, slip rings mounted upon said brush carriage and connected electrically to the brushes carried in the rotatable brush carriage, and fixed alternating current output brushes bearing upon said slip rings, said brush carriage being propelled only by friction between itself and the rotor and commutator and being retarded by a speed sensitive braking means comprising a centrifugally operated brake.

3. A dynamoelectric machine comprising a stationary field member, a wound rotor member provided with a commutator, said field and rotor members being laminated to conduct substantially all of the flux along an entirely laminated iron circuit, a rotatable brush carriage carrying rotating brushes which bear upon the commutator, slip rings mounted upon said brush carriage and connected electrically to the brushes carried in the rotatable brush carriage, and fixed alternating current output brushes bearing upon said slip rings, said brush carriage being propelled only by friction between itself and the rotor and commutator and being retarded by a speed sensitive braking means comprising a windage producing means.

4. A dynamoelectric machine comprising a stationary field member, a wound rotor member provided with a commutator, said field and rotor members being laminated to conduct substantially all of the flux along an entirely laminated iron circuit, a rotatable brush carriage carrying rotating brushes which bear upon the commutator, slip rings mounted upon said brush carriage and connected electrically to the brushes carried in the rotatable brush carriage, and fixed alternating current output brushes bearing upon said slip rings, said brush carriage being propelled only by friction between itself and the rotor and commutator and being retarded by a speed sensitive braking means comprising an eddy current generating means.

5. A dynamoelectric machine comprising a stationary field member, a wound rotor member provided with a commutator, said field and rotor members being laminated to conduct substantially all of the flux along an entirely laminated iron circuit, a rotatable brush carriage carrying rotating brushes which bear upon the commutator, slip rings mounted upon said brush carriage and connected electrically to the brushes carried in the rotatable brush carriage, and fixed alternating current output brushes bearing upon said slip rings, said brush carriage being propelled only by friction between itself and the rotor and commutator and being retarded by a speed sensitive braking means comprising a centrifugally operated brake and a windage brake.

6. A dynamoelectric machine comprising a stationary field member, a wound rotor member provided with a commutator, said field and rotor members being laminated to conduct substantially all of the flux along an entirely laminated iron circuit, a rotatable brush carriage carrying rotating brushes which bear upon the commutator, slip rings mounted upon said brush carriage and connected electrically to the brushes carried in the rotatable brush carriage, and fixed alternating current output brushes bearing upon said slip rings, said brush carriage being propelled only by friction between itself and the rotor and commutator and being retarded by a speed sensitive braking means comprising a centrifugally operated brake and an eddy current generating means.

7. A dynamoelectric machine comprising a stationary field member, a wound rotor member provided with a face type commutator, said field and rotor members being laminated to conduct substantially all of the flux along an entirely laminated iron circuit, a rotatable brush carriage carrying rotating brushes which bear upon the face type commutator and which are spring urged in a direction parallel to the machine axis whereby they are rendered insensitive to centrifugal force, slip rings mounted upon said brush carriage and connected electrically to the brushes carried in the rotatable brush carriage, and fixed alternating current output brushes bearing upon said slip rings, said brush carriage being propelled only by friction between itself and the rotor and commutator and being retarded by a speed sensitive braking means.

8. A dynamoelectric machine comprising a stationary field member, a wound rotor member provided with a commutator, said field and rotor members being laminated to conduct substantially all of the flux along an entirely laminated iron circuit, a rotatable brush carriage carrying rotating brushes which bear upon the commutator, slip rings mounted upon said brush carriage and connected electrically to the brushes carried in the rotatable brush carriage, fixed alternating current output brushes bearing upon said slip rings, and fixed direct current brushes bearing upon the commutator in an area not contacted by the rotating brushes, said brush carriage being propelled only by friction between itself and the rotor and commutator and being retarded by a speed sensitive braking means.

9. A generator apparatus comprising a variable speed prime mover, a dynamoelectric machine, and a driving means connecting the prime mover and dynamoelectric machine, said driving means being capable of transmitting torque in only one direction, said dynamoelectric machine comprising a stationary field member, a wound rotor member provided with a commutator, said field and rotor members being laminated to conduct substantially all of the flux along an entirely laminated iron circuit, a rotatable brush carriage carrying rotating brushes which bear upon the commutator, slip rings mounted upon said brush carriage and connected electrically to the brushes carried in the rotatable brush carriage, and fixed alternating current output brushes bearing upon said slip rings, said brush carriage being propelled only by friction between itself and the rotor and commutator and being retarded by a speed sensitive braking means.

10. A generator apparatus comprising a variable speed prime mover, a dynamoelectric machine, and a driving means connecting the prime mover and dynamoelectric machine, said driving means being capable of transmitting torque in only one direction, said dynamoelectric machine comprising a stationary field member, a wound rotor member provided with a face type commutator, said field and rotor members being laminated to conduct substantially all of the flux along an entirely laminated iron circuit, a rotatable brush carriage carrying rotating brushes which bear upon the face type commutator and which are spring urged in a direction parallel to the machine axis whereby they are rendered insensitive to centrifugal force, slip rings mounted upon said brush carriage and connected electrically to the brushes carried in the rotatable brush carriage, and fixed alternating current output brushes bearing upon said slip rings, said brush carriage being propelled only by friction between itself and the rotor and commutator and being retarded by a speed sensitive braking means.

11. A generator apparatus comprising a variable speed prime mover, a dynamoelectric machine, and a driving means connecting the prime mover and dynamoelectric machine, said driving means being capable of transmitting torque in only one direction, said dynamoelectric machine comprising a stationary field member, a wound rotor member provided with a face type commutator, said field and rotor members being laminated to conduct substantially all of the flux along an entirely laminated iron circuit, a rotatable brush carriage carrying rotating brushes which bear upon the face type commutator and which are spring urged in a direction parallel to the machine axis whereby they are rendered insensitive to centrifugal force, slip rings mounted upon said brush carriage and connected electrically to the brushes carried in the rotatable brush carriage, fixed alternating current output brushes bearing upon said slip rings and fixed direct current collecting brushes bearing upon the face type commutator in an area not wiped by the rotating brushes, said brush carriage being propelled only by friction between itself and the rotor and commutator and being retarded by a speed sensitive braking device.

12. A generator apparatus comprising a variable speed prime mover, a dynamoelectric machine, and a driving means connecting the prime mover and dynamoelectric machine, said driving means being capable of transmitting torque in only one direction, said dynamoelectric machine comprising a stationary field member, a wound rotor member provided with a combined face and barrel type commutator, said field and rotor members being laminated to conduct substantially all of the flux along an entirely laminated iron circuit, a rotatable brush carriage carrying rotating brushes which bear upon the face portion of the commutator and which are spring urged in a direction parallel to the machine axis whereby they are rendered insensitive to centrifugal force, slip rings mounted upon said brush carriage and connected electrically to the brushes carried in the rotatable brush carriage, fixed alternating current output brushes bearing upon said slip rings and fixed direct current collecting brushes bearing upon the barrel portion of the commutator, said brush carriage being propelled only by friction between itself and the rotor and commutator and being retarded by a speed sensitive device.

13. A dynamoelectric machine comprising a stationary field member, a wound rotor member provided with a commutator, a rotatable brush carriage carrying rotating brushes which bear upon the commutator, slip rings mounted upon said brush carriage and connected electrically to the brushes carried in the rotatable brush carriage, and fixed alternating current output brushes bearing upon said slip rings, said brush carriage being propelled only by friction between itself and the rotor and commutator and being retarded by a speed sensitive braking means.

References Cited in the file of this patent

UNITED STATES PATENTS

| | | |
|---|---|---|
| 522,241 | Thomson | July 3, 1894 |
| 1,406,366 | Fynn | Feb. 14, 1922 |
| 1,526,613 | Stephenson | Feb. 17, 1925 |
| 1,694,121 | Granat | Dec. 4, 1928 |
| 2,345,805 | Gibson | Apr. 4, 1944 |
| 2,379,154 | Hoover | June 26, 1945 |
| 2,629,075 | Deschmann | Feb. 17, 1953 |

FOREIGN PATENTS

| | | |
|---|---|---|
| 809,544 | France | Dec. 12, 1936 |
| 994,017 | France | Aug. 3, 1951 |